United States Patent [19]

Hubbard

[11] 4,414,711

[45] Nov. 15, 1983

[54] SECURITY CORD HOLDER

[76] Inventor: Merle H. Hubbard, 222 W. 2nd, P.O. Drawer YY, Cortez, Colo. 81321

[21] Appl. No.: 296,889

[22] Filed: Aug. 27, 1981

[51] Int. Cl.³ ............................................. F16G 11/14
[52] U.S. Cl. ................................. 24/129 C; 24/131 R
[58] Field of Search ............ 24/115 K, 115 N, 129 R, 24/129 B, 129 C, 129 D, 131 R, 131 C; 339/101, 104

[56] References Cited

U.S. PATENT DOCUMENTS

| | | | |
|---|---|---|---|
| 856,722 | 6/1907 | Pedersen | 24/129 A |
| 1,660,829 | 2/1928 | Burd | 24/129 R |
| 2,090,897 | 8/1937 | Ray et al. | 24/129 R X |
| 2,438,101 | 3/1948 | Wright | 24/129 B |
| 2,641,079 | 6/1953 | Oster | 24/131 C X |
| 3,499,103 | 3/1970 | Pearce | 339/106 X |

*Primary Examiner*—Robert P. Swiatek
*Attorney, Agent, or Firm*—Howard I. Podell

[57] ABSTRACT

My invention consists of a single unitary shaped resilient rod formed with an open eye section at one end of the rod of a size to detachably fit permanently about a flexible electrical cord near the attachment plug of the cord. The rod extends at right angles to the attached cord for a first distance and then extends a second distance at right angles to this first distance for a length generally of the length of an attached plug and socket assembly. The rod then extends along a diagonal axis towards the cord to terminate in an open S or Z shape of a size to permit wrapping about a second flexible electric cord attached to a socket joined to the plug of the first cord. The invention thus serves to prevent disengagement of the plug from the socket, and prevents separation of two attached electrical cords. The shape of the unit also permits it to fit over several coils of a single cord with the eye section being located near first end of the coiled cord, and the S section wrapped about a length of the second end of the coiled cord, so as to hold the coils together, when it is desired to shorten the effective length of a single electrical cord.

10 Claims, 11 Drawing Figures

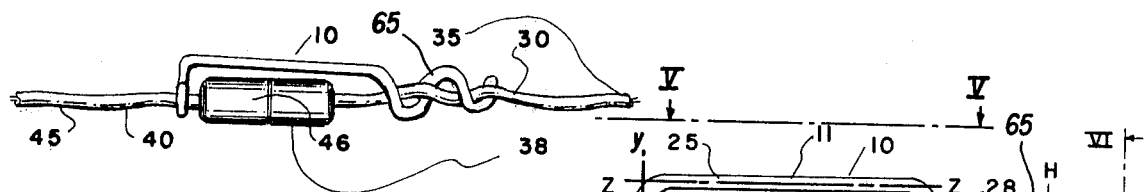
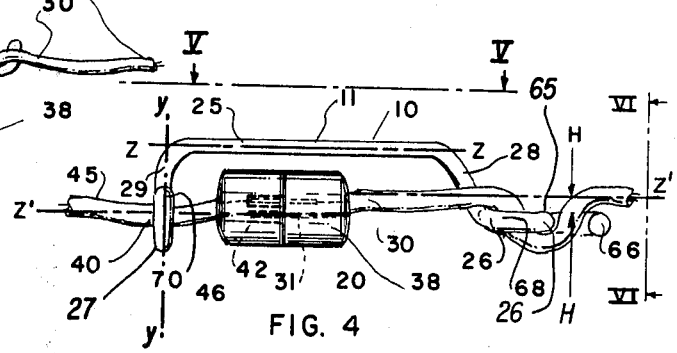
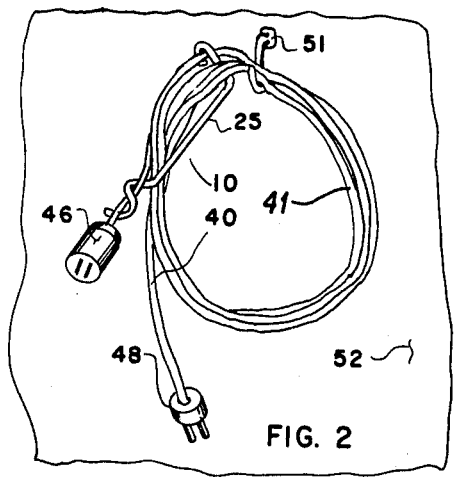
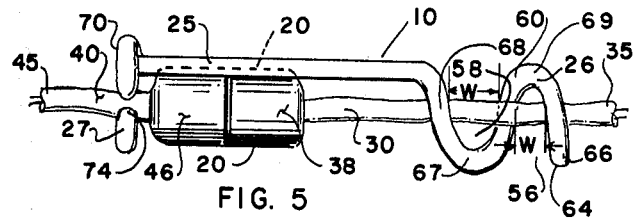
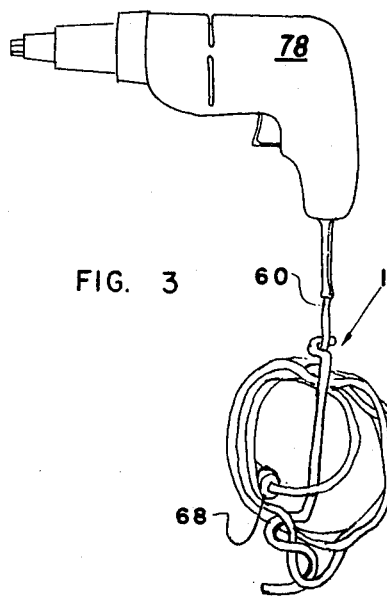
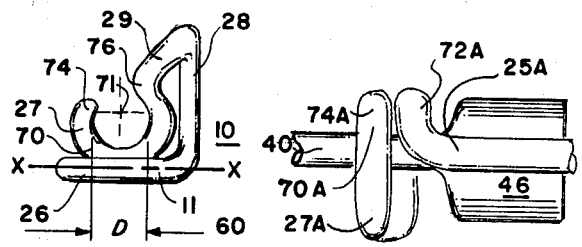
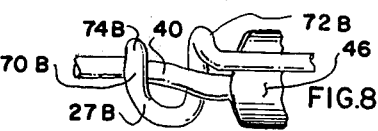
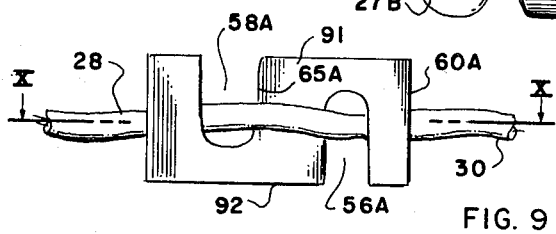
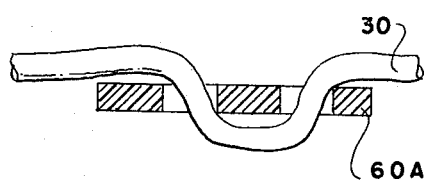
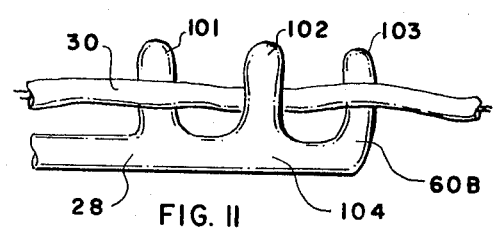

SECURITY CORD HOLDER

BACKGROUND OF THE INVENTION

Many devices have been disclosed for holding attached electrical cords together, such as those disclosed in the following U.S. Pat. Nos. 3,871,731; 3,484,736; 3,223,958; 2,406,567; 2,461,427; 2,720,633; 2,721,313; 2,753,536; 3,097,034; 3,922,055; 3,611,265; and 4,206,961.

These prior devices do not suggest the simplicity and effectiveness of my invention.

SUMMARY OF THE INVENTION

My invention consists of a single unitary shaped resilient rod formed with an open eye section at one end of the rod of a size to detachably fit permanently about a flexible electrical cord near the attachment plug of the cord. The rod extends at right angles to the attached cord for a first distance and then extends a second distance at right angles to this first distance for a length generally of the length of an attached plug and socket assembly. The rod then extends along a diagonal axis towards the cord to terminate in an open S or Z shape of a size to permit wrapping about a second flexible electric cord attached to a socket joined to the plug of the first cord. The invention thus serves to prevent disengagement of the plug from the socket, and prevents separation of two attached electrical cords.

The shape of the unit also permits it to fit over several coils of a single cord with the eye section being located near first end of the coiled cord, and the S section wrapped about a length of the second end of the coiled cord, so as to hold the coils together, when it is desired to shorten the effective length of a single electrical cords.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a perspective view of the invention in use, in physically holding two attached line cords together;

FIG. 2 is a perspective view of the invention in the stored position about a single line cord;

FIG. 3 is a perspective view of the invention employed to shorten the effective length of a single coiled electrical cord;

FIG. 4 is an elevation view of the invention in use;

FIG. 5 is a plan view of the invention taken along line V—V of FIG. 4;

FIG. 6 is an end view of the invention, itself, taken along line VI—VI of FIG. 4;

FIG. 7 is a detail elevation view of an alternative form of the open coil end of the invention;

FIG. 8 is a detail elevation view of a second alternative embodiment of the open coil end of the invention FIG. 9 is a detail plan view of an alternative embodiment of the S-section;

FIG. 10 is a sectional view taken along line X—X of FIG. 9; and

FIG. 11 is a detail plan view of a second alternative embodiment.

DESCRIPTION OF THE PREFERRED EMBODIMENT

Turning now descriptively to the drawings, in which similar reference characters denote similar elements throughout the several views, as shown in FIGS. 1, 4 and 5, my security cord holder 10 may be employed to detachably latch about end sections 30 and 40 of flexible electrical line cords 35 and 45 respectively to prevent disengagement of the engaged attachment plug 38 and socket 46 of cords 35 and 45 respectively, with holder 10 absorbing any tensile forces in the two cords that would otherwise tend to separate the plug 38 from the socket 46.

FIG. 2 illustrates the holder 10 latched about two sections of cord 40 so as to prevent separation of the holder from the cord 40 and to fasten the holder stem 25 about coiled sections of cord 40 to retain cord 40 in the form of coil 41 that may easily be hung on a hook 51 of a wall 52 for storage purposes.

As shown in FIG. 3, the holder 10 may be fastened about coiled section of cord 60 leading from a hand tool 78 so as to shorten the effective length of the line cord from the tool 78 to the cord socket 68.

As shown in FIGS. 4, 5 and 6, the invention 10 is formed of a continuous shaped resilient rod 11 preferably formed of resilient material and preferably formed of a uniform circular cross-section. For purposes of description, the axis X—X of first end section 26 as shown in FIG. 6, shall be viewed as lying in a horizontal plane, while the axis Y—Y of second end section 27, as shown in FIG. 4 shall be viewed as lying in a vertical plane and the axis Z—Z of intermediate section 25 shall be taken as lying in a horizontal plane that is parallel to the axis Z'—Z' of the connector assembly 20. However, such orientations are recited solely for descriptive purposes and in the actual invention, these axes may vary in orientation with respect to each other and with respect to horizontal and vertical planes.

FIGS. 4 and 5 illustrate the holder 10 secured about joined line cords 30, 40, with FIG. 6 illustrating the holder 10 independent of the cords for purposes of clarity.

Electrical cords 30 and 40 are electrically and physically connected to plug 38 and socket 46 which are frictionally electrically engaged together by electrical contacts 31, 42 respectively to form connector assembly 20. Without the use of holder 10, the connector assembly 20 would become disengaged by tensile stress in cords 30, 40 directed away from the connector assembly 20. However holder 10 is detachably fixed about the connector assembly 20 and to cords 30, 40 so as to absorb such a tensile stress and to maintain the plug 38 engaged to socket 46, when installed.

Holder 10 is formed at a first end section 26 in the shape of two joined continuous U-shaped sections 67, 69, both lying in a common horizontal plane, inverted with respect to each other to form an S-shaped section 60.

A leg 68 of U-section 67 is joined to diagonal section 28 of the holder, U-section 67 and 69 each joined to opposed end sections of a common leg 65. Leg section 66 of U-section 69 extends away from U-section 69 to terminate in a rounded tip 64, with legs 65, 66 and 68 extending transversely to the axis Z'—Z' of the connector assembly 20 and the axis of straight sections of electrical cords 30, 40 extending along axis Z'—Z' from respective opposed ends of the connector assembly.

Preferably the plane of S-section 60 extends a spaced distance H from axis Z'—Z', which distance H is preferably equal to or greater than half the thickness of line cord 30.

The second end section 27 of the holder 10 is formed of an open coil section 70 extending in a vertical plane that is perpendicular to the axis Z—Z of intermediate section 25, to an end section of which it is joined by section 29. Preferably the center 71 of coil section 70 lies along axis Z'—Z', with the diameter D of the central opening of the coil section being somewhat greater than the thickness of line cord 40. The coil 70 may be readily engaged about cord 40 adjacent to the connection socket 46 by passing wire 40 through the space separating the end tip 74 of the coil 70 and the opposed end section 76 of the coil which section 76 joins coil 70 to section 29 of the holder.

As shown in FIG. 5, 6, coil 70 may be in the form of an incomplete open circle lying in a common vertical plane. Alternatively as shown in FIG. 7, the end section 27A may consist of more than one full turn of an open spiral segment 70A, with the tip 74A of segment 70A lying adjacent to an adjoining section 72A of the spiral segment. Since the rod 11 is formed of resilient material, tip 74A may be spread away from section 72A to permit placement of, or removal of, wire 40 in the open center section 71 of spiral segment 70A. A still further alternative embodiment is shown in FIG. 8, with open coil 70B being in the form of an open spiral shape with tip 74B spaced apart from adjoining section 72B of the open coil 70B.

In the case of all alternatives of the coil section, it is formed with a central opening 71 of a size to fit relatively freely about an electrical cord 40, but opening 71 is substantially of a smaller area than the cross-section of a plug 46 or socket 38 that is attached to a cord 40, so that the coil acts as a bearing member against the end of a socket 46 or a plug to prevent lateral movement of the socket 46 away from its mating plug 38 when the coil section is restrained, itself from lateral movement by the anchoring effect of S-section 60 with regard to cord 30. End section 29, attached to coil section 70 extends along an axis Y—Y that is perpendicular to the axis Z'—Z' of the connector 20 for a distance sufficient to enable intermediate section 25, to which it is joined, to extend along an axis Z—Z, parallel to axis Z'—Z', and to be clear of contact with the assembled connector 20. Intermediate section 25 is joined to diagonal section 28 which extends freely beyond the end of plug 38, along a diagonal line to join S-section 60. Preferably the intermediate section extends from above the connector assembly axis Z'—Z' to a distance below the axis Z'—Z', clearing axis Z'—Z' by a distance greater than half the thickness of cord 30 so as to avoid contact with a section of cord 30 that lies along axis Z'—Z' adjacent the connector plug 38, with section 25 and sections 28 being of a combined length and joined together at an angle of a size to space opposing end coil section 70 from the S-section 60 by a distance greater than the length of assembled connector 20 along the axis Z'—Z'.

Leg members 68, 65, and 66 of S-section 60 are each spaced apart by a distance W that is greater than the thickness of cord 30 so that a cord 30 may be readily fastened to S-section 60 so that it will not slide in the direction of the axis of the cord or the axis Z'—Z' of the connector plug 38, attached to the cord. As shown in FIGS. 4 and 5, the shape of S-section 60 enables the user to extend cord 30 under leg 65 and over adjacent legs 68 and 66 so as to form a U-bend or V-bend in the cord 30 about leg 26 and a reverse bend of the cord about adjacent legs 68 and 66. While a cord so fastened is secured to the S-section in a direction along the axis of the cord, the user can readily detail the cord from the S-section by sliding the cord laterally in a first direction perpendicular to the cord axis through the opening 56 between legs 65 and 66, and then sliding the cord in a second direction opposite to that of the first direction through the opening 58 between legs 68 and 65, with the reverse routine serving to attach a cord to the S-section.

While section 28 has been disclosed as extending along a diagonal line with regard to the axis Z—Z of intermediate section 25 and the plane of S-section 60, it will be apparent that the length of section 25 may be made sufficiently large to enable section 28 to extend along a line parallel to section 29.

The holder 10 is formed with an intermediate section spaced at a distance to, and substantially parallel to the axis of a cord connector member with one end of this intermediate section joined to an open coil section that freely fits about a line cord but abuts an end of the cord connector member and extends along an axis substantially perpendicular to the axis of the line cord and connector body. The second end of the intermediate section is joined to an S-section, U-section, W-section or Z-section that is located at a distance free of contact with an assembled connector assembly but which is of a size and shape to permit a flexible electrical cord to be wound about one or more leg sections so as to fix the cord to the said second end section in the direction of travel of the axis of the cord.

As shown in FIGS. 9, 10 the plate 60A may serve as an alternative embodiment of the S-section. Plate 60A is attached to diagonal section 28 and formed with a first slot 58A opening from a first side 91 of plate 60A spaced at a distance from a second slot 56A that opens to a second side 92 opposed to first side 91. Slots 58A and 56A are separated by an intermediate transverse section 65A. Line cord 30 is readily fastened to or unfastened from plate 60A, with plate 60A in the fastened position restraining cord 30 from movement in the direction of the axis of the cord since the cord extends under transverse section 65A at the middle of the plate 60A and bends about section 65A to extend over the transverse end sections of plate 60A that are spaced adjacent to respective opposite lateral sides of section 65A of slots 58A and 56A.

As shown in FIGS. 2 and 3, the holder may be readily fastened about two spaced sections of a single line cord so as to retain a coiled section of the line cord in place between the two said spaced sections of cord.

FIG. 11 discloses an alternative embodiment of the second end section of the device in the form of a W-section 60B formed of three spaced apart leg sections 101, 102, 103 each extending in the same general direction from a common axially extending section 104 that joins diagonal section 28.

While the unit may be made in many sizes for use with different size wires and electrical connector assemblies, it should be noted that the cross-sectional size of an electrical line cord is many times smaller in proportion than the cross-sectional size of a connector assembly member such as a plug or socket, so that one size of unit will operate satisfactorily over a wide range of size of line cords.

Since obvious changes may be made in the specific embodiment of the invention described herein, such modifications being within the spirit and scope of the invention claimed, it is indicated that all matter container herein is intended as illustrative and not as limiting in scope.

Having thus described the invention, what I claim as new and desire to secure by Letters Patent of the United States is:

1. A retainer unit for mounting about two spaced apart sections of an electrical cord unit so as to prevent separation of a connector assembly between and detachably joining said sections and adaptable to alternatively retain a coil of said cord between two cord sections comprising a shaped unitary resilient rod formed at a first end section with an eye section shaped with opening means so as to enable a first section of an entire electrical cord to be readily inserted into an opening in the center of said eye section through said opening means, and formed at the second end section with fastening means, said fastening means shaped to detachably engage or alternatively be disengaged about a second section of an electrical cord, together with an intermediate section of the retainer unit that joins said first end section to said second end section, said intermediate section shaped to extend at a distance from a longitudinal axis joining said first end section to said second end section so as to clear an object such as a cord connector assembly located between said first end section and said second end section of the unit, the longitudinal axis of said fastening means being located within a substantially horizontal plane and the longitudinal axis of said eye section extending along a substantially vertical plane with respect to the longitudinal axis of said fastening means.

2. The invention as recited in claim 1 in which the eye section of the unit is in the form of an open coil, extending generally in a plane along a substantially transverse angle to the said longitudinal axis so that the coil abuts against a connector assembly member fastened to a line cord, that may be located between the eye section and the fastening means of the said second end section of the retainer, with an eye opening in said eye section formed of a size such that a said line cord readily passes through said eye opening of said coil, when said coil and said connector assembly member are moved towards each other, with said coil eye opening being of a cross-sectional size not smaller than the cross-section size of an electrical line cord with which the unit is to be engaged and smaller in cross-sectional size than that of a connector assembly member fastened to such an electrical line cord.

3. The invention as recited in claim 2 in which the open coil is in the form of a discontinuous circular member.

4. The invention as recited in claim 3 in which the open coil is in the form of a spiral shape.

5. The invention as recited in claim 1 in which the fastening means of the second end section of the retainer unit is fitted with engagement means to limit movement of an electrical cord along the general axial direction of the electrical cord engaged to said fastening means, with respect to said fastening means, said engagement means of a size to enable an engaged electrical line cord to be moved freely in a transverse direction to said axial direction with respect to said fastening means, so as to enable an engaged line cord when moved in said transverse direction to be moved to a position in which it becomes disengaged from said fastening means.

6. The invention as recited in claim 5 in which said fastening means is in the form of at least one U-shaped section.

7. The invention as recited in claim 6 in which the said fastening means extends substantially along a plane parallel to and spaced from the longitudinal axis.

8. The invention as recited in claim 7 in which the said fastening means is in the form of an S-shaped unit.

9. The invention as recited in claim 6 in which the said fastening means is in the form of an plurality of joined leg members, each spaced from the other by a slot, said leg members extending transversely to the longitudinal axis, each said slot open to one side of the fastening means.

10. The invention as recited in claim 9 in which two slots adjoin a common leg member, with each said slot open to an opposed side of the said fastening means.

* * * * *